United States Patent
Singh (10) Patent No.: US 12,368,597 B2
(45) Date of Patent: Jul. 22, 2025

(54) METHOD AND SYSTEM FOR THE SECURE ONBOARDING OF LOW ENERGY PERIPHERAL DEVICES

(71) Applicant: Arlo Technologies, Inc., Carlsbad, CA (US)

(72) Inventor: Rajinder Singh, San Jose, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 339 days.

(21) Appl. No.: 18/115,371

(22) Filed: Feb. 28, 2023

(65) Prior Publication Data

US 2024/0291667 A1 Aug. 29, 2024

(51) Int. Cl.
*H04L 9/32* (2006.01)
*H04L 9/14* (2006.01)

(52) U.S. Cl.
CPC .............. *H04L 9/3242* (2013.01); *H04L 9/14* (2013.01)

(58) Field of Classification Search
CPC ....... H04L 9/3242; H04L 9/14; H04L 9/0825; H04L 9/3247; H04L 9/3271; H04L 63/0435; H04L 63/12; H04L 67/12; H04W 4/50; H04W 12/06; H04W 12/50; H04W 4/80
See application file for complete search history.

(56) References Cited

U.S. PATENT DOCUMENTS

| | | | |
|---|---|---|---|
| 12,075,246 B2 * | 8/2024 | Duo | H04W 4/80 |
| 2006/0112419 A1 * | 5/2006 | Brown | H04L 63/12 |
| | | | 726/5 |
| 2006/0126846 A1 * | 6/2006 | Araki | H04L 63/08 |
| | | | 380/277 |
| 2007/0210923 A1 * | 9/2007 | Butler | H01Q 1/2216 |
| | | | 340/572.7 |
| 2008/0010218 A1 * | 1/2008 | Zank | G06Q 20/382 |
| | | | 705/75 |
| 2013/0116664 A1 * | 5/2013 | Tai | A61M 5/14276 |
| | | | 604/891.1 |

(Continued)

FOREIGN PATENT DOCUMENTS

| CN | 114363871 A | * | 4/2022 | ............. | G06F 9/453 |
|---|---|---|---|---|---|
| WO | WO-2023219234 A1 | * | 11/2023 | ............. | G06F 9/453 |

*Primary Examiner* — John B King
(74) *Attorney, Agent, or Firm* — Boyle Fredrickson, S.C.

(57) ABSTRACT

A method and system are provided for securely onboarding a Bluetooth Low Energy peripheral device or other peripheral device operating over a personal area network (PAN) onto a cloud-based network system. The method includes providing a private-public key pair, wherein the private key is stored on the peripheral device and the public key is stored on a database within the cloud-based network system. Upon user activation, the peripheral device begins advertising, using a PAN communications protocol, a first hash value generated with the private key, which is received at the cloud-based processor and verified with the corresponding public key. In response to verifying the first hash value, the cloud-based processor transmits a public key encrypted random code, which is received at the peripheral device and decrypted with the private key. In response, the peripheral device then transmits a second hash value generated with the private key, which is also received at the cloud-based processor and is then verified with the public key.

14 Claims, 3 Drawing Sheets

(56) References Cited

U.S. PATENT DOCUMENTS

| | | | |
|---|---|---|---|
| 2014/0073252 A1* | 3/2014 | Lee | H04M 1/72412 |
| | | | 455/41.2 |
| 2014/0237028 A1* | 8/2014 | Messenger | A61B 5/1118 |
| | | | 709/203 |
| 2015/0119077 A1* | 4/2015 | Buchheim | G01S 5/14 |
| | | | 455/456.1 |
| 2015/0134552 A1* | 5/2015 | Engels | G06Q 10/087 |
| | | | 705/318 |
| 2015/0207796 A1* | 7/2015 | Love | H04L 63/10 |
| | | | 726/4 |
| 2017/0111170 A1 | 4/2017 | Baghdasaryan | |
| 2017/0171754 A1* | 6/2017 | South | H04W 12/06 |
| 2018/0270340 A1 | 9/2018 | Ahmad et al. | |
| 2020/0196122 A1* | 6/2020 | Junk | H04L 9/3213 |
| 2021/0051053 A1* | 2/2021 | Barghi | H04L 25/03929 |
| 2021/0297317 A1* | 9/2021 | Thompson | H04L 41/0816 |
| 2021/0377726 A1 | 12/2021 | Finney | |
| 2022/0330029 A1* | 10/2022 | Wang | H04W 12/108 |
| 2023/0274335 A1* | 8/2023 | Stollznow | G06Q 20/42 |
| | | | 705/15 |

* cited by examiner

METHOD AND SYSTEM FOR THE SECURE ONBOARDING OF LOW ENERGY PERIPHERAL DEVICES

FIELD OF THE INVENTION

This invention relates generally to the introduction of peripheral devices to a wireless network, and in particular, to a method of securely onboarding peripheral devices to a wireless network utilizing short range wireless communication protocols such as Bluetooth® to communicate with a cloud-based processor. The invention additionally relates to a system that implements such a method.

BACKGROUND OF THE INVENTION

The Internet is a global system of interconnected computers and computer networks that communicate with each other. The Internet of Things (IoT) applies this concept to a network of linked everyday objects which can communicate, be read, recognized, located, and controlled via the internet or other communication networks.

The number and variety of IoT devices continues to grow. In the area of automation of homes and buildings, smart homes and buildings may have centralized control over nearly any device or system in the home or office, from appliances to home and business security systems. In the field of asset tracking, commercial businesses, hospitals, factories, and large organizations can utilize IoT devices to track the locations of various assets such as equipment, patients, products, vehicles, etc. In the area of health and wellness, doctors can remotely monitor patients' health, and laypeople can track the progress of fitness routines. In the area of personal safety, individuals can track their own or location or the location of others, receive location-based notifications, and request security intervention or emergency services through the use of low energy peripheral devices such as portable Bluetooth® Low Energy (BLE) buttons communicating using short range wireless communication protocols usable over a Personal Area Network (referred to herein as "personal area network communications" or "PAN communications). These communications most typically are Bluetooth®, but sometimes take the form of other communications such as Zigbee® Z-Wave™, and MQTT™. For the sake of conciseness, the term "PAN communications protocol" will be understood to include Bluetooth®, Zigbee®, Z-Wave™, MQTT™, and other communications protocols operable in a short range in a PAN. Devices communicating via such a PAN communications protocol will be referred to herein as a "BLE" device.

Continued proliferation of IoT devices will inevitably lead to numerous IoT devices surrounding a user at home, at work, at school, and in many other locations. As more and more IoT devices become linked to internet networks or other communication networks, problems related to the configuring and onboarding such devices to wireless networks are becoming more frequent. In particular, existing protocols and systems for configuring devices to access wireless networks tend to suffer from drawbacks and limitations; which include a complex user experience, insufficient reliability, and security vulnerabilities. For example, configuring IoT devices to access Wi-Fi networks and/or other similar wireless networks typically requires association and authentication of the IoT device. In certain cases, a process called "onboarding" may be used to accomplish the secure admission to the wireless network. Onboarding allows client devices, such as BLE buttons that may lack a user-friendly interface to provide sufficient information about the wireless network being accessed to accomplish the admission and authentication processes required to join the wireless network in a traditional manner. However, mechanisms that are currently used to onboard such devices tend to focus on two general methods: out-of-band conveyance in which network configuration information is conveyed using some mechanism other than the wireless network itself, e.g., a camera scanning a quick response code, or having the peripheral devices negotiate over the destination wireless network itself, e.g., "network-ready" IoT client devices. As indicated above, these mechanisms tend to be complex, unreliable, and/or insecure. Often, the onboarding of such devices is susceptible to security threats, such as so-called "man-in-the-middle" type security attacks. As such, there exists a need for securely onboarding peripheral devices to a wireless network utilizing Bluetooth® or another PAN communication protocol to communicate with a cloud-based processor and to a system that implements such a method.

SUMMARY OF THE INVENTION

In accordance with a first aspect of the invention, a system and method of securely onboarding a client device such as a camera, a sensor, a BLE button, or other IoT (Internet of Things) device, utilizing Bluetooth communication protocol is provided. A "BLE button" in this regard is a push-button hand-carried device that communicates via a PAN communications protocol, typically a Bluetooth® signal.

In accordance with the present invention, a method of securely onboarding a Bluetooth Low Energy (BLE) peripheral device onto a cloud-based network system is provided. The method includes the steps of providing a private-public key pair, e.g., PKI (Public Key Infrastructure), wherein the private key is stored on the peripheral device and the public key is stored on a database within the cloud-base network system. Upon user activation, the peripheral device begins advertising, via a PAN communications protocol transmission from the peripheral device, a first hash value, generated with the private key, to a cloud-based processor. The cloud-based processor then verifies the first hash value with the corresponding public key. In response to verifying the first hash value, the cloud-based processor transmits a public key encrypted random code, which is received at the peripheral device and decrypted with the private key stored on that peripheral device. In response, the peripheral device then transmits a second hash value, generated with the private key, to the cloud-based processor. The cloud-based processor then verifies the second hash value with the public key. If any of the transmissions sent from the peripheral device and/or cloud-based processor are not verified by one or the other, then the onboarding process will not be initiated.

A nonlimiting feature of this embodiment is to provide a unique data set which is written to the peripheral device and from which the first hash value may be generated through the use of the private key, such that the peripheral device alone may verify the data set upon receipt of a return transmission from the cloud-based processor.

An aspect of the method of securely onboarding the peripheral device may include the first hash value being a function of a unique serial number of the peripheral device that is generated through the use of the private key.

Another aspect of the method of securely onboarding the BLE peripheral device may include the step of transmitting, from the peripheral device, a serial number associated with the peripheral device in combination with the first hash value during the initial advertising step, such that the serial number and first hash value are received by the cloud-based processor.

A nonlimiting feature of this embodiment is to provide a unique dataset at the cloud-based processor from which the second hash value may be generated through the use of the public-private key pair, such that the cloud-based processor alone may verify the dataset upon receipt of a return transmission from the client device.

An aspect of the method of securely onboarding the BLE peripheral device may include the step of encoding a public key, a random code that is generated at the cloud-based processor and that is stored on a database in communication with the cloud-based processor, such that such that the cloud-based processor alone may verify the data set upon receipt of a return transmission from the client device.

Another aspect of the method of securely onboarding the BLE peripheral device may include the step of transmitting, from the cloud-based processor, a public key encrypted serial number associated with the peripheral device in combination with a public key encrypted random code, such that the encoded serial number is received by the peripheral device and is decrypted by the private key during verification.

A nonlimiting feature of this embodiment is to provide a mobile device, such as a handheld mobile device that can communicate with both the cloud-based processor via a long range wireless signal, such as Wi-Fi over the Internet or a cellular network, and with the peripheral device via Bluetooth® or another PAN communications protocol, and thereby receive and transmit data between the peripheral device and the cloud-based processor.

Another aspect of the method of securely onboarding the BLE peripheral device may include the step of providing a mobile computing device in wireless communication with the cloud-based processor via a long-range wireless signal, in which case the mobile computing device may be configured to communicate with the BLE peripheral device via a PAN communication protocol.

Another feature of this aspect may include the step of initiating the secure onboarding of the BLE peripheral device to the cloud-based network system by initiating communication between a mobile computing device and the BLE peripheral device from an application in the mobile computing device.

A nonlimiting feature of this aspect is to provide the peripheral device without a user interface, in which case secure onboarding is facilitated by a mobile device.

Another non-limiting feature of this aspect may include the step of depressing a button disposed on the BLE peripheral device to activate BLE advertising. In response to the advertising, the mobile computing device receives at least the first hash value at the mobile computing device via a PAN communication protocol, and transmits at least the first hash value from the mobile computing device to the cloud-based processor via a long range wireless signal.

In accordance with yet another aspect of the present invention, a method of securely onboarding a BLE peripheral device onto a cloud-based network system is provided. The method includes the steps of initiating a BLE advertising state in the peripheral device including transmission of a serial number associated with the peripheral device and a first hash value of the serial number generated from a unique pr-provisioned private key. The cloud-based processor receives and verifies the first hash value with a public key paired to the private key. In response to verifying the first hash value, the cloud-based processor generates and transmits a public key encrypted signal including a random code and the serial number corresponding to the peripheral device. Upon receiving the public key, the peripheral device decrypts the random code and the serial number with the private key and verifies that the decrypted serial number is equal to the serial number associated with the peripheral device. In response to this verification, the peripheral device transmits a second hash value of the random code generated from the private key. Upon receiving the second hash value from the peripheral device, the cloud-base processor uses the public key to confirm that the random code received in the second hash code matches the random code generated at the cloud-based processor.

In accordance with yet another aspect of the present invention, a system is configured to securely onboard a BLE peripheral device onto a cloud-based network system. The system includes a BLE peripheral device having a pre-provisioned private key and a serial number, a cloud-based network system having a public key pair to the pre-provisioned private key, and a mobile computing device configured to communicate with the cloud-based network via a long-range wireless signal and to communicate with the peripheral device via a PAN communication protocol.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE DRAWINGS

Figure 1:
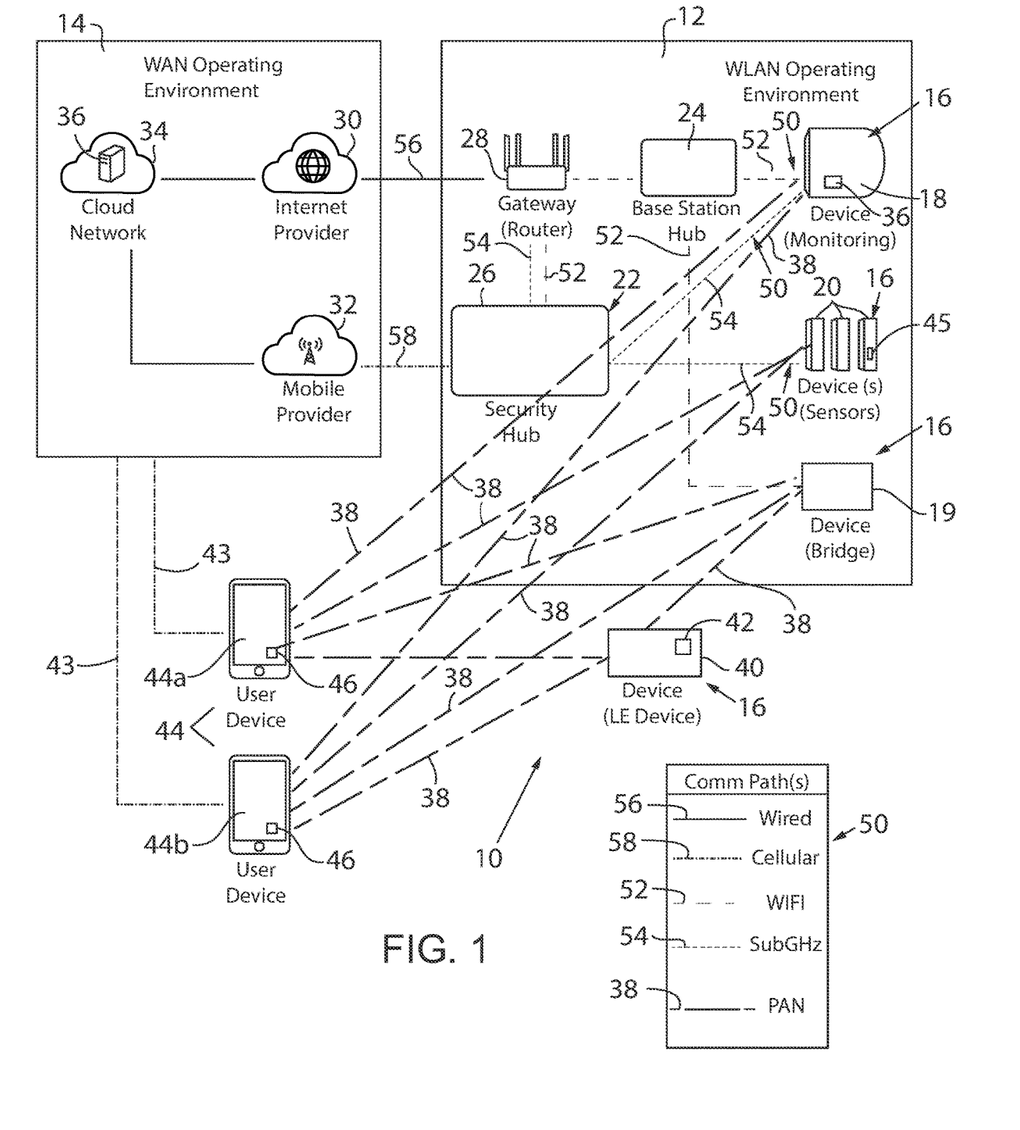
FIG. 1 is a block diagram of a system for electronic monitoring in which a one or more Bluetooth low energy (BLE) devices may be securely paired to a mobile application in a cloud-based network in accordance with one embodiment of the present invention.

Referring to FIG. 1, an electronic monitoring system 10 in accordance with an aspect of the present invention is generally shown-. Electronic monitoring system 10 is implemented in a wireless communication operating environment. For example, wireless communication may be implemented by a WLAN (wireless local area network) operating environment (WLAN 12) or by communications technology on a personal area network (PAN) between the various components of electronic monitoring system 10 and/or one or more user devices 44, as hereinafter described. As mentioned above, communications may occur using Bluetooth® technology, but may also occur using Zigbee® or another short-range protocol. The term "PAN" should be understood to encompass all such communication technologies.

In the depicted embodiment, WLAN 12 is communicatively connected to a WAN (wide area network) operating environment, designated by the reference numeral 14. Within WLAN 12, various peripheral devices, also known as "client devices" 16, such as monitoring devices 18, bridges 19 and sensors 20, are wirelessly networked to a base station or high frequency hub 24 which, in turn, communicates with the WAN 14 via a gateway hub shown as gateway router 28. Base station hub 24 and router 28 provide a high frequency connection to the WAN 14. Base station hub 24 may be eliminated as a stand-alone module if its functionality is incorporated into the gateway router 28, in which case the router 28 also serves as a base station hub. The system may also include a security hub 26 that communicates with monitoring device(s) 18 and with the WAN 14 and provides a low frequency connection between the WAN 14 and monitoring devices 18. If present, the security hub may also communicate with the router or hub 28, such as through a high frequency connection path 52 and/or a low frequency connection 54 path to the router 28. The security hub 26 is also provided with the capability of providing a high frequency connection with monitoring devices 18. If the security hub 28 is not present.

Still referring to FIG. 1, gateway router 28 is typically implemented as a Wi-Fi hub that communicatively connects WLAN 12 to WAN 14 through an internet provider 30. Internet provider 30 includes hardware or system components or features such as last-mile connection(s), cloud interconnections, DSL (digital subscriber line), cable, and/or fiber-optics. As mentioned, the functionality of the base station hub 24 also could be incorporated into the router 28, in which case the router 28 becomes the base station hub, as well as the router. Another connection between WLAN 12 and WAN 14 may be provided between security hub 26 and a mobile provider 32. Mobile provider 32 includes hardware or system components or features to implement various cellular communications protocols such as 3G, 4G, LTE (long term evolution), 5G, or other cellular standard(s). Besides the mobile connection, security hub 26 typically also is configured to connect to WAN 14 by way of its connection to router hub 28 and the router hub's connection to WAN 14 through internet provider 30. Each of the internet provider 30 and mobile provider 32 allows the components of system 10 to interact with a backend system or control service that can control functions or provide various processing tasks of components of system 10, shown as a cloud-based backend control service system 34, which could be an Arlo SmartCloud™ system. The backend system, such the cloud-based control service system 34 includes at least one cloud-based server 36, each of which includes at least a power supply, a system board, one or more CPUs, memory, storage, such as a sharable database, and a network interface. The at least one cloud-based server 36 typically provides, for example, cloud-base onboarding capabilities for peripheral client devices 16 as will be described in further detail below, cloud storage of data, for example events, AI (artificial intelligence) based processing such as computer vision, and system access to emergency services.

As noted above, the client devices 16 of electronic monitoring system 10 may include one or more monitoring devices 18 that are mounted to face toward respective areas being monitored, such as around a building or other structure or area. Monitoring devices 18 may perform a variety of monitoring, sensing, and communicating functions. Each monitoring device 18 includes firmware stored in non-volatile memory thereon. As is conventional, the firmware acts as the monitoring device's complete operating system, performing all control, monitoring and data manipulation functions. The system 10 may also include device(s) and system(s) that perform functions other than monitoring. Such devices include smart home devices such as HVAC control systems and components. They also could include one-touch type communication devices such as panic buttons and other communication buttons. One such button is marketed under Arlo Technologies, Inc. of Carlsbad, California under the brand name ARLO SAFE™. All of these devices and systems can be considered "monitoring devices" for purposes of the present discussion. Devices that communicate using LE protocols such as Bluetooth® can be considered "LE devices". Devices that communicate with Bluetooth® Low Energy, are considered "BLE peripherals", including the "BLE Button".

One such monitoring device 18 may include an imaging device, such as a video camera, that is configured to capture and store visual images or video of the monitored area within the environment, e.g., an Arlo® camera available from Arlo Technologies, Inc. of Carlsbad, California. In addition to containing a camera, the monitoring device 18 may also include a one or more sensors configured to detect one or more types of conditions or stimuli, for example, motion, opening or closing events of doors or windows, the presence of smoke, carbon monoxide, water leaks, and temperature changes. Instead of, or in addition to, containing sensors, monitoring device 18 may have audio device(s) such as microphones, sound sensors, and speakers configured for audio communication or providing audible alerts. Other types of monitoring devices 18 may have some combination of sensors 20 and/or audio devices without having imaging capability. One such device is Arlo Chime™ which has only audio capabilities. Sensors 20 or other monitoring devices 18 also may be incorporated into form factors of other house or building accessories, such as doorbells, floodlights, etc.

In order to allow for low and high frequency communication on WLAN 12, it is contemplated for monitoring devices 18 to have two radios operating at different frequencies. A first, "primary" radio operates at a first frequency, typically at a relatively high frequency, typically of 2.4 GHz to 5 GHZ, during period of normal conductivity to perform monitoring and data capture functions such as video capture and transmission, sound transmission, motion sensing, etc. The second or "secondary radio" operates at a second frequency that is immune to, or at least resistant to, resistance from signals that typically jam signals over the first frequency. The second frequency may be of considerably lower frequency in the sub-GHz or even RF range and may have a longer range than the primary radio. It is intended for the secondary radio to be operable when communications over the primary communication path are disrupted in order to permit the continued operation of monitoring devices 18, as well as to permit transmit and display information regarding the communications disruption to be transmitted and displayed for a user. The term "disruption," as used herein, applies equally to an initial failure to connect over the primary communication path upon device startup and a cessation or break in connection after an initial successful connection. In addition, it is contemplated for each monitoring device 18 to include Bluetooth® or any PAN communications module 35 designated for wireless communication. As is known, module 35 allows monitoring devices 18 to communicate directly with one or more user devices 44 over a wireless Personal Area Network (PAN) 38 via one or more PAN communication protocols such as Bluetooth®, Zigbee®, Z-Wave™, and MQTT™. Likewise, sensors 20 may similarly include Bluetooth® or any PAN communications module 45 to allow sensor 20 to communicate directly with one or more user devices 44 over a wireless Personal Area Network (PAN) 38 using one or more PAN communication protocols.

One or more of the client devices 16 may take the form of low energy (LE) devices 40 which utilize Bluetooth® or other PAN communications protocols to communicate. It is intended for LE devices 40 to perform a variety of basic tasks. For example, one such device is an Arlo® Security Light equipped with a motion sensor which illuminates an area in response to motion detection. Other LE devices 40 may include one or more sensors configured to detect one or more types of conditions or stimulus, for example, motion, opening or closing events of doors or windows, the presence of smoke, carbon monoxide, water leaks, and temperature changes and provide an alert in response thereto. Alternatively, LE devices 40 may be configured to actuate components such as door locks, switches or the like in response to a command by a user. LE devices 40 include a firmware image stored in non-volatile memory thereon. Alternatively, the LE device 40 also could include one-touch type communication devices such as panic buttons and other communication buttons. As is conventional, the firmware image acts as LE device's complete operating system, performing all control, monitoring and data manipulation functions. Each LE device 40 further includes Bluetooth® or any PAN communications technology module 42 designated for wireless communication using low energy "LE" protocols. As is known, modules 42 allows LE devices 40 to communicate with various components, such as one or more user devices 44 or bridge 19 over PAN 38, as hereinafter described.

In order for LE devices 40 to communicate on WLAN 12, bridges 19 are provided. Similar to monitoring devices 18, LE devices 40 may include two radios operating at different frequencies in order to allow for low and high frequency communication on WLAN 12. A first, "primary" radio operates at a first frequency, typically at a relatively high frequency, typically of 2.4 GHz to 5 GHZ, during periods of normal conductivity. The second or "secondary radio" operates at a second frequency that is immune or at least resistant to resistance from signals that typically jam signals over the first frequency. The second frequency may be of considerably lower frequency in the sub-GHz or even RF range and may have a longer range than the primary radio. It is intended for the secondary radio to be operable, when communications over the primary communication path are disrupted. In addition, it is contemplated for each bridge 19 to include Bluetooth® or any PAN technology module 46 designated for wireless communication. As is known, modules 46 allows bridges 19 to communicate directly with LE devices 40 over PAN 38, as hereinafter described.

Still referring to FIG. 1, one or more user devices 44, such as a mobile device, smart phone, tablet, laptop, or PC, may communicate with various components of electronic monitoring system 10. It can be understood that user devices 44 may communicate with the various components of electronic monitoring system 10 utilizing WLAN 12, WAN 14 and/or PAN 38 to provide an interface through which a user may interact with electronic monitoring system 10, including client devices 16. Furthermore, in those embodiments of the user device 44, in which the user device 44 is a mobile device, smart phone, tablet or the like configured for cellular communication, the user device 44 may communicate with the WAN 14 over a cellular communication path 43 as shown between user device 44 and mobile provider 32. Accordingly, through communication with the mobile provider 32, each user device 44 may form a communication pathway with the at least one cloud-based server 36 of the cloud-based control service system 34. Alternatively, when operating within WLAN 12, the cellular equipped user device 44 may alternatively communicate with the WAN 14 via the cellular communication path 43 or the gateway router 28 in communication with the internet provider 30. Whether through the Wi-Fi connection to the gateway router 28 or its respective internet provider 30, the user device 44 is configured to form a communication pathway with the cloud-based server 36. Furthermore, each user device 44 includes a display system that typically includes both an audio display and a video display such as a touchscreen. Each user device 44 also has internal computing and storage capabilities and a program or application, such as the Arlo® Smart application, serving as the user interface with the remainder of system 10. Each user devices 44 include at least one actuatable user input 46, FIGS. 1-2. In response to the information provided on the display of the one or more user devices 44, a user may actuate the at least one actuatable user input 41 to address the information.

Still referring to FIG. 1, within WLAN 12, multiple communication paths 50 are defined that transmit data between the various components of system 10. Communication paths 50 include a default or primary communication path 52 providing communication between monitoring device 18 and the base station hub 26, and a fail-over or fallback secondary communication path 54 providing communication between monitoring device 18 and the security hub 26. Optionally, some of the monitoring devices 18 that do not require high bandwidth to operate may only communicate through the secondary communication path 54, such as sensors 20 shown in FIG. 1. Thus, even during a failure of the primary communication path 52, sensors 20 will continue to operate normally. A collective area in which device communication can occur through the primary communication path 52 defines a primary coverage zone. A second, typically extended, collective area in which the peripheral device communication can occur through the secondary communication path 54 defines a secondary coverage zone. A wired communication path 56 is shown between the router 28 and the internet provider 30, and a cellular communication path 58 is shown between security hub 26 and mobile provider 32. WAN 14 typically includes various wireless connections between or within the various systems or components, even though only wired connections 56 are shown. If the security hub 26 and the associated secondary communication path 54 are not present, the sensors 20 may communicate directly with the base station hub 24 (if present, or the router 28 if the functionality of the base station hub is incorporated into the router) via the primary communication path 52.

Primary communication path 52 also extends between bridge 19 and the base station hub 26, and secondary communication path 54 may provide for fail-over or fallback communication between bridge 19 and the security hub 26, if the security hub 26 is present. The controllers of bridges 19 may also provide a wireless communication path directly to the router 28.

As described, electronic monitoring system 10 is configured to implement a seamless OTA communication environment for each client device 16 by implementing a communication path switching strategy as a function of the operational state of primary and/or secondary communication paths, as heretofore described. For example, each monitoring device 18 is configured to acquire data and to transmit the acquired data, or data obtained by processing the acquired data, to a respective hub 24 and/or 26 for further processing and/or further transmission to a server such as the server 36 of the cloud-based control service system 34 and/or the user device(s) 44. The server 36 or other computing components of system 10 or otherwise in the WLAN 12 or WAN 14 can include or be coupled to a microprocessor, a microcontroller or other programmable logic element (individually and collectively considered "a controller") configured to execute a program. The controller also may be contained in whole in the monitoring device 18, base station hub 24, security hub 26, and/or the WIFI hub or router 28. Alternatively, interconnected aspects of the controller and the programs executed by it could be distributed in various permutations within the monitoring device 18, the hubs 24 and 26, router 28, and the server 36. This program may be utilized in filtering, processing, categorizing, storing, recalling and transmitting data received from the monitoring device 18 via the hubs 24 and 26, router 28, and server 36. Server 36 or another appropriate system device may also be in communication with or include a computer vision program ("CV"), which can apply one or more filters or processes, such as edge detection, facial recognition, motion detection, etc., to detected one or more characteristics of the recording such as, but not limited to, identifying an individual, animal, vehicle, or package present in the recording.

Other client devices in the form of LE devices 40 are configured to transmit data through a corresponding bridge 19 via PAN 38 to a respective hub 24 and/or 26 for further processing and/or further transmission to a server such as the server 36 of the cloud-based control service system 34 and/or the user device(s) 40. For example, each LE device 40 will periodically broadcast a beacon including its current state, which is received by a corresponding bridge 19, the device type, the current version of firmware on LE device 40, the serial number, or other device details needed for the firmware upgrade process. Bridge 19 transmits the beacon through a respective hub 24 and/or 26 to server 36, as heretofore described. It is further contemplated for such information to be accessible to a user through the one or more user devices 44 communicating with backend control service system 34, such as the cloud-based server 36, either by the user directly accessing backend control service system 34 or by backend control service system 34 transferring information to or causing a notification or causing a corresponding graphical icon to be provided on a display of the one or more user devices 44.

Figure 2:
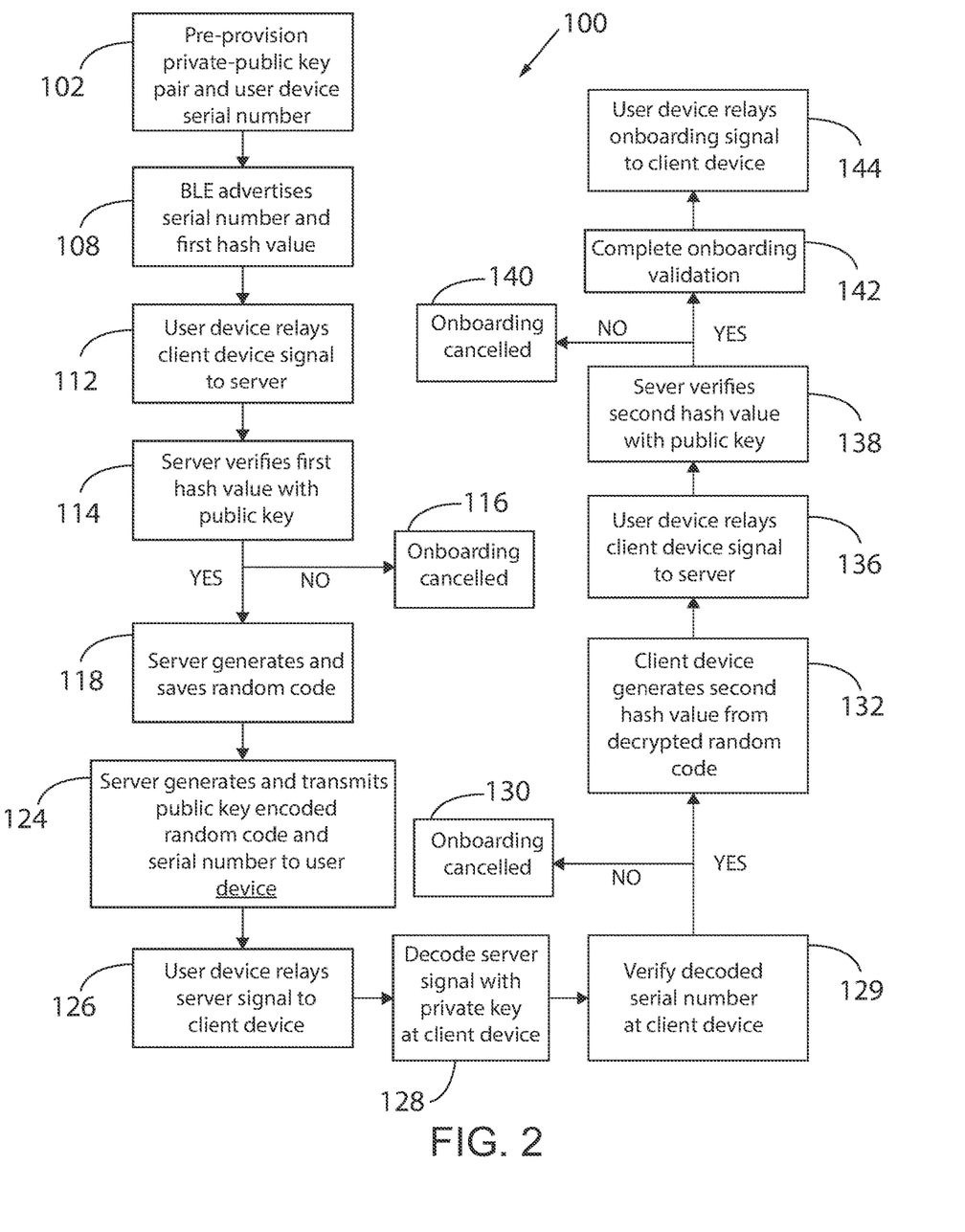
FIG. 2 is a flowchart showing a set of steps in the methodology of securely onboarding a BLE peripheral in accordance with one embodiment of the present invention.
Figure 3:
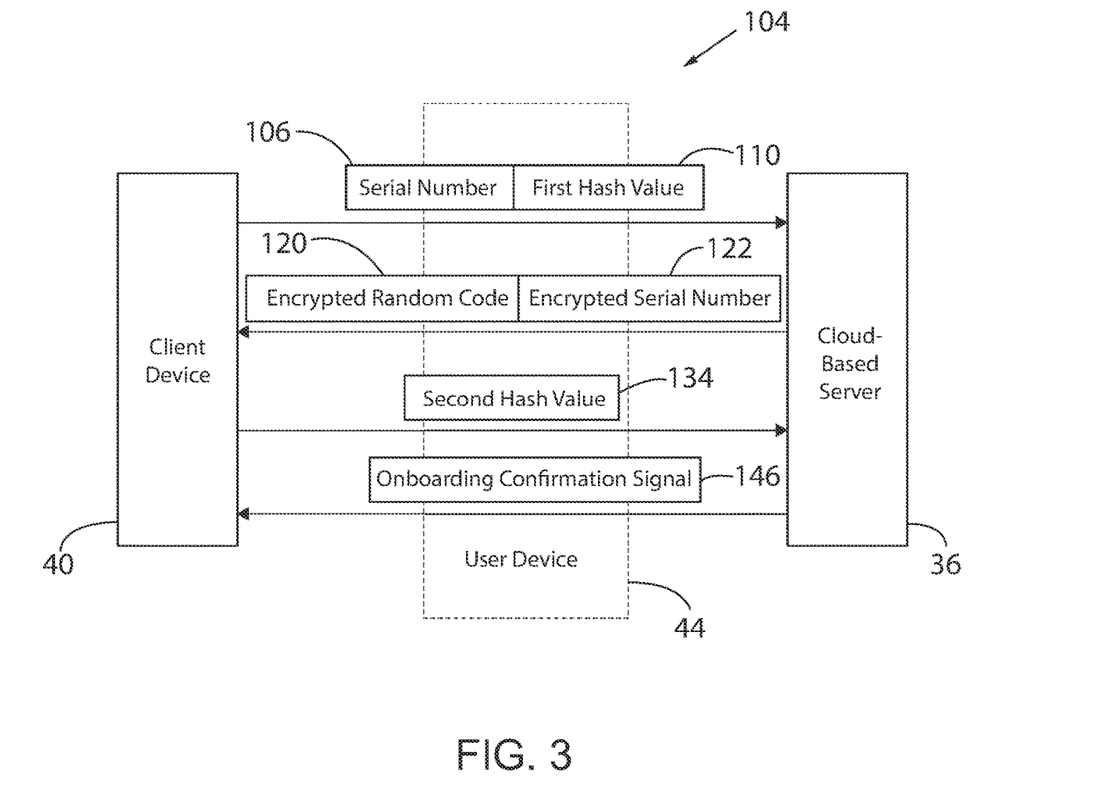
FIG. 3 is a block diagram of the system executing the methodology of FIG. 2.

Turning now to FIGS. 2 and 3, flow chart 100 and corresponding diagram 104 depict one embodiment of a process of onboarding a peripheral or client device 16 such as a LE device 40 in the form of Low Energy button or "BLE Button". Initially at block 102, the client device 40 is pre-provisioned with a serial number 106 and a unique private key that are written to the client device 40. The private key is paired to a public key that is stored in the database of the cloud-based processor or server 36. More specifically, the public key and its associated private key together make up a key-pair that are generated at the same time and that are mathematically matched or linked. The public key is part of a digital certificate and is available for unrestricted use from the database of the cloud-based processor or server 36; whereas the paired private key is protected by and available only to the unique LE device 40 or other peripheral device to which the private key is written. This limited access to the private key ensures that communications that use the private key are maintained secure. In use, data sent from the LE device 40 may be linked or "signed" with the private key, and the recipient of the signed data, e.g. the cloud-based processor or server 36, can use the paired public key to verify the origin and integrity of the data, as will be described in further detail below.

Moving forward, at block 108, the onboarding process is initiated by the LE device 40 entering an advertising mode in which both the serial number 106 associated with the LE device 40 and the first hash value 110, which is a function of the serial number 106 of the client device 40 generated with the private key, are transmitted. In one embodiment of the invention, at subsequent block 112, the user device 44 serving as the user interface, receives the advertised information via secure BLE channel 43 and transmits the serial number 106 and first hash output or value 110 to the cloud-based server 36 via a cellular communication path 43 or via the internet provider 30 as a Wi-Fi signal. These operations may be performed by running a program or application, such as the Arlo Smart application, on the user device 44.

At block 114, the first hash value 110 is verified against the serial number 106 that was transmitted along with the first hash value 110 though use of the corresponding paired public key. That is to say that the serial number 106, which was utilized as the input for the first hash function and generated with the private key to create the first hash value 110 output, is confirmed to match or be equal to the serial number 106 that was transmitted in the advertising step, through application of the corresponding public key. In the event that the first hash value 110 is not verified by the cloud-based server 36, the application running on the user device 44 returns a pairing error indication, and discontinues attempted onboarding at block 116.

Alternatively, in the event that the cloud-based server 36 successfully verifies the first hash value 110 corresponds to the serial number 106 of the client device 40 by way of the paired public key, the cloud-based server 36 then generates a random code that is stored as an entry to the database of the cloud-based server 36 associated with the client device 40 at block 118. An encrypted version of the random code 120 and encrypted serial number 122 associated with the client device 40 are then generated by way of the public key at the cloud-based server 36, and transmitted to the user device 44 running a program or application, such as the Arlo Smart application, at block 124. Then, at block 126, user device 44 transmits the encrypted random code and serial number, via secure BLE channel, to the client device 44 via a secure BLE channel. At block 128, firmware operating on the client device 40 decrypts the encrypted random code 120 and encrypted serial number 122 after utilizing the private key, and at subsequent block 129 the decrypted serial number is verified against the serial number 106 written to the client device. More specifically, the private key paired to the public key is used to decrypt the encrypted random code 120 and encrypted serial number 122. The decrypted serial number is then verified against the original unique serial number 106 written to the client device 40 to confirm the client device's identicality. In the event that the decrypted serial number is not verified by the client device 40, either due to decryption failure or a dissimilar serial number comparison, the application running on the user device 44 returns a pairing error indication and discontinues attempted onboarding at block 130.

Alternatively, in the event that the client device 40 successfully verifies the decrypted serial number to match the unique serial number 106 written to the client device 40 by way of the paired private key decryption, the process 100 proceeds to block 132 at which the client device 40 then generates a second hash value 134, which is a function of the decrypted random code that was originally generated at the cloud-based server 36, by way of the private key. At block 136, the client device 40 transmits the second hash value to the user device 44 via secure BLE channel, which in turn transmits the second hash value to the cloud-based server 36 via a cellular communication path 43 or via a Wi-Fi signal though the internet provider 30. At block 138, the second hash value 134 is then verified at the cloud-based server 36 against the original random code generated by the cloud-based server 36. The verified second hash value then is stored to a database in the server 36 though use of the corresponding paired public key. However, in the event that the second hash value is not verified by the cloud-based server 36, the application running on the user device 44 returns a pairing error indication and discontinues attempted onboarding at block 140.

In the event that the cloud-based server 36 successfully verifies the second hash value 134, i.e., matches the random code generated at the cloud-based server 36 to that transmitted via the second hash value 134 via the paired public key, the onboarding process of the client device is validated at block 142. At final block 144, a validation confirmation signal 146 is transmitted from the cloud-based server 36 to the client device 40 by way of the user device 44 running a program or application on the user device 44, completing a successful pairing operation.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

We claim:

1. A method of securely onboarding a peripheral device onto a cloud-based network system, comprising:
   providing a private-public key pair, wherein the private key is stored on the peripheral device and the public key is stored on a database within the cloud-based network system, wherein the peripheral device is a low energy device;
   advertising, via a private area network (PAN) communications protocol from the peripheral device, a serial number associated with the peripheral device and a first hash value of the serial number generated with the private key;
   receiving and verifying, at a cloud-based processor of the cloud-based network, the first hash value with the public key;
   in response to verifying the first hash value, transmitting, from the cloud-based processor, a public key encrypted signal including a random code and the serial number, wherein the random code is generated by the cloud-based processor;
   receiving and decrypting, at the peripheral device, the public key encrypted signal with the private key;
   verifying, at the peripheral device, that the decrypted serial number is equal to the serial number associated with the peripheral device;
   transmitting, from the peripheral device, a second hash value of the random code generated with the private key;
   receiving and verifying, at the cloud-based processor, the second hash value with the public key; and
   verifying, at the cloud-based processor, that the random code received in the second hash value is equal to the random code generated at the cloud-based processor.

2. The method of claim 1, wherein receiving and verifying the first hash value with the public key includes: verifying, at the cloud-based processor, that the serial number from which the first hash value is derived matches the serial number associated with the peripheral device.

3. The method of claim 1, wherein receiving and decrypting the public key encrypted signal includes: verifying, at the cloud-based processor, that the serial number from which the first hash value is derived matches the serial number associated with the peripheral device.

4. The method of claim 1, further comprising: providing a mobile computing device in wireless communication with the cloud-based processors via the internet, wherein the mobile computing device is configured to communicate with the peripheral device via a PAN communications protocol; and, initiating the secure onboarding of the peripheral device to the cloud-based network system by initiating communication between the mobile computing device and the peripheral device from an application in the mobile computing device.

5. The method of claim 4, wherein advertising the first hash value generated with the private key includes: depressing a button disposed on the peripheral device to activate advertising; receiving the first hash value at the mobile computing device; and, transmitting the first hash value from the mobile computing device to the cloud-based processor via the internet.

6. A method of securely onboarding a Bluetooth Low Energy (BLE) peripheral device onto a cloud-based network system, comprising:
   initiating a BLE advertising state in the peripheral device including transmitting a serial number associated with the peripheral device and a first hash value of the serial number generated from a unique private key;
   receiving and verifying, at a cloud-based processor, the first hash value with a public key paired to the private key;
   in response to verifying the first hash value, generating and transmitting, at the cloud-based processor, a public key encrypted signal including a random code and the serial number;
   receiving and decrypting, at the peripheral device, the random code and the serial number with the private key;
   verifying, at the peripheral device, that the decrypted serial number is equal to the serial number associated with the peripheral device;
   transmitting, from the peripheral device, a second hash value of the random code generated from the private key;
   receiving and verifying, at the cloud-based processor, the second hash value with the public key; and
   verifying, at the cloud-based processor, that the random code received in the second hash code is equal to the random code generated at the cloud-based processor.

7. The method of claim 6, further comprising: providing a mobile computing device in wireless communication with the cloud-based processors via the Internet, wherein the mobile computing device is configured to communicate with the peripheral device via a PAN communications protocol; and, initiating the secure onboarding of the peripheral device to the cloud-based network system by initiating communication between the mobile computing device and the peripheral device from an application in the mobile computing device.

8. The method of claim 7, wherein initiating a BLE advertising state includes: depressing a button disposed on the peripheral device to activate BLE advertising; receiving, at the mobile computing device, the serial number associated with the peripheral device and the first hash value; and, transmitting the first hash value from the mobile computing device to the cloud-based processors via the Internet or a data signal.

9. The method of claim 7, further comprising: transmitting, via the Internet or a data signal, a first pairing confirmation signal from the cloud-based processor to the mobile computing device in response to verifying at the cloud-based processor that the random code received in the second hash code is equal to the random code generated at the cloud-based processor; and, transmitting, via the PAN communications protocol, a second pairing confirmation signal from the mobile computing device to the peripheral device.

10. The method of claim 6, further comprising pre-provisioning the peripheral device with the unique private key and the serial number before the initiating the BLE advertising state in the peripheral device, including transmission of the serial number associated with the peripheral device and the first hash value of the serial number generated from the unique private key.

11. A peripheral device for a cloud-based network system, wherein the peripheral device is a low energy device, comprising:
 a radio that is configured to transmit and receive signals to and from a cloud-based processor of the cloud-based network system and a mobile computing device; and
 a processor coupled to the radio, wherein
 a pre-provisioned serial number and a private key of a private-public key pair are stored in the processor; and wherein
 the processor is configured to:
  advertise, via a private area network (PAN) communications protocol, a serial number associated with the peripheral device and a first hash value generated from the serial number with the private key;
  in response to advertising the first hash value, receive, from the cloud-based network system, a random code and the serial number encrypted with a public key of the private-public key pair, wherein the random code is generated by the cloud-based network system;
  decrypt and verify, at the peripheral device, that the received serial number is equal to the serial number associated with the peripheral device;
  in response to verifying the serial number, transmit a second hash value of the random code generated with the private key for verification by the cloud-based network system.

12. The peripheral device of claim 11, wherein the peripheral device is configured to communicate with the cloud-based processor via a long-range wireless signal, and wherein the peripheral device is configured to communicate with the mobile computing device via the PAN communications protocol.

13. The peripheral device of claim 11, wherein the processor of the peripheral device is configured to initiate the secure onboarding of the peripheral device to the cloud-based network system by receiving a signal from an application in the mobile computing device using the PAN communications protocol.

14. The peripheral device of claim 11, wherein the low energy device is a Bluetooth button.

* * * * *